United States Patent
Oh et al.

(10) Patent No.: US 9,287,564 B2
(45) Date of Patent: Mar. 15, 2016

(54) LITHIUM SECONDARY BATTERY POSITIVE ELECTRODE MATERIAL FOR IMPROVING OUTPUT CHARACTERISTICS AND LITHIUM SECONDARY BATTERY INCLUDING THE SAME

(75) Inventors: Song Taek Oh, Daejeon (KR); Sung Kyun Chang, Daejeon (KR); Sin Young Park, Daejeon (KR); Sun Jung Hwang, Daejeon (KR); Jin Hyung Lim, Daejeon (KR); Geun Chang Chung, Daejeon (KR); Sin Kyu Kim, Daejeon (KR); Jung Seok Choi, Daejeon (KR); KeunWan An, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/566,360

(22) Filed: Aug. 3, 2012

(65) Prior Publication Data

US 2013/0221283 A1  Aug. 29, 2013

Related U.S. Application Data

(63) Continuation of application No. PCT/KR2012/002537, filed on Apr. 4, 2012.

(30) Foreign Application Priority Data

Apr. 4, 2011 (KR) .................. 10-2011-0030665

(51) Int. Cl.
*H01M 4/88* (2006.01)
*H01M 4/58* (2010.01)
(Continued)

(52) U.S. Cl.
CPC ......... *H01M 4/5825* (2013.01); *C01G 45/1228* (2013.01); *C01G 51/50* (2013.01);
(Continued)

(58) Field of Classification Search
CPC . H01M 4/131; H01M 10/0525; Y02E 60/122
USPC ............. 252/182.1, 519.1, 506; 320/128; 429/61, 128, 209, 219, 220, 231.95, 429/231.1, 221; 361/502
See application file for complete search history.

(56) References Cited

U.S. PATENT DOCUMENTS

| 8,148,015 B2* | 4/2012 | Pan et al. ................. 429/231.1 |
| 2002/0122983 A1 | 9/2002 | Nakai et al. |

(Continued)

FOREIGN PATENT DOCUMENTS

| CN | 101038960 A | 9/2007 |
| CN | 101577324 A | 11/2009 |

(Continued)

OTHER PUBLICATIONS

International Search Report dated Sep. 25, 2012 for International Application No. PCT/KR2012/002537.

(Continued)

*Primary Examiner* — Khanh Tuan Nguyen
(74) *Attorney, Agent, or Firm* — Birch, Stewart, Kolasch & Birch, LLP

(57) ABSTRACT

Provided are a positive electrode active material for improving an output and a lithium secondary battery including the same. Particularly, graphite and conductive carbon which have shapes and sizes different from each other, may be simultaneously coated on a mixed positive electrode material of a 3-component system lithium-containing metal oxide having a layered structure and expressed as following Chemical Formula 1 and LiFePO$_4$ having an olivine structure as an conductive material to improve high resistance occurrence and conductivity reduction phenomenon of a 3-component system lithium metal oxide due to a difference between particle sizes and surface areas of the 3-component system lithium-containing metal oxide and LiFePO$_4$ olivine.

$Li_{1+a}Ni_xCo_yMn_{1-x-y}O_2$, $0 \leq a < 0.5$, $0 < x < 1$, $0 < y < 0$ [Chemical formula 1]

8 Claims, 1 Drawing Sheet

(51) Int. Cl.
| | | |
|---|---|---|
| *H01M 4/131* | (2010.01) | |
| *H01M 4/505* | (2010.01) | |
| *H01M 4/525* | (2010.01) | |
| *H01M 10/052* | (2010.01) | |
| *C01G 45/12* | (2006.01) | |
| *C01G 51/00* | (2006.01) | |
| *C01G 53/00* | (2006.01) | |
| *H01M 4/36* | (2006.01) | |

(52) U.S. Cl.
CPC .............. *C01G 53/50* (2013.01); *H01M 4/131* (2013.01); *H01M 4/364* (2013.01); *H01M 4/505* (2013.01); *H01M 4/525* (2013.01); *H01M 10/052* (2013.01); *C01P 2004/80* (2013.01); *C01P 2006/40* (2013.01); *Y02E 60/122* (2013.01); *Y02T 10/7011* (2013.01); *Y10S 903/907* (2013.01)

(56) References Cited

U.S. PATENT DOCUMENTS

| | | | | |
|---|---|---|---|---|
| 2006/0216605 | A1 | 9/2006 | Shirakata et al. | |
| 2007/0026315 | A1 | 2/2007 | Lampe-Onnerud et al. | |
| 2007/0254209 | A1* | 11/2007 | Baba et al. | 429/129 |
| 2008/0020280 | A1* | 1/2008 | Miura et al. | 429/221 |
| 2008/0050655 | A1 | 2/2008 | Chu et al. | |
| 2009/0325041 | A1* | 12/2009 | Okumura et al. | 429/61 |
| 2010/0062339 | A1 | 3/2010 | Pan et al. | |
| 2010/0112443 | A1 | 5/2010 | Blomgren et al. | |
| 2010/0112445 | A1* | 5/2010 | Park et al. | 429/221 |
| 2010/0203388 | A1 | 8/2010 | Kim et al. | |
| 2010/0283429 | A1* | 11/2010 | Ofer et al. | 320/128 |
| 2012/0099244 | A1* | 4/2012 | Lee et al. | 361/502 |

FOREIGN PATENT DOCUMENTS

| | | | | | |
|---|---|---|---|---|---|
| EP | CN 101110473 | A | * | 1/2008 | ............ B06L 11/18 |
| JP | 2002-198101 | A | | 7/2002 | |
| JP | 2007207490 | A | | 8/2007 | |
| JP | 2007-234565 | A | | 9/2007 | |
| JP | 2007-317583 | A | | 12/2007 | |
| JP | 2011-044245 | | * | 3/2011 | ......... H01M 10/052 |
| JP | 2011-44245 | A | | 3/2011 | |
| JP | 2011-113889 | A | | 6/2011 | |
| KR | 10-2008-0008247 | A | | 1/2008 | |
| KR | 10-2008-0019533 | A | | 3/2008 | |
| KR | 10-2009-0018981 | A | | 2/2009 | |
| KR | 10-0889622 | B1 | | 3/2009 | |
| KR | 10-2009-0119447 | A | | 11/2009 | |
| KR | 10-2010-0013673 | A | | 2/2010 | |
| KR | 10-0954591 | B1 | | 4/2010 | |
| WO | WO 2007/139333 | A1 | | 12/2007 | |
| WO | WO 2008/001791 | A | | 1/2008 | |

OTHER PUBLICATIONS

Extended European Search Report, dated Sep. 10, 2014, for European Application No. 12767790.4.
China Office Action for Appl. No. 201280003639.4 dated Oct. 21, 2014 (w/ English translation).
Chinese Office Action issued in Chinese Patent Application No. 201280003639.4 on Aug. 6, 2015.

* cited by examiner

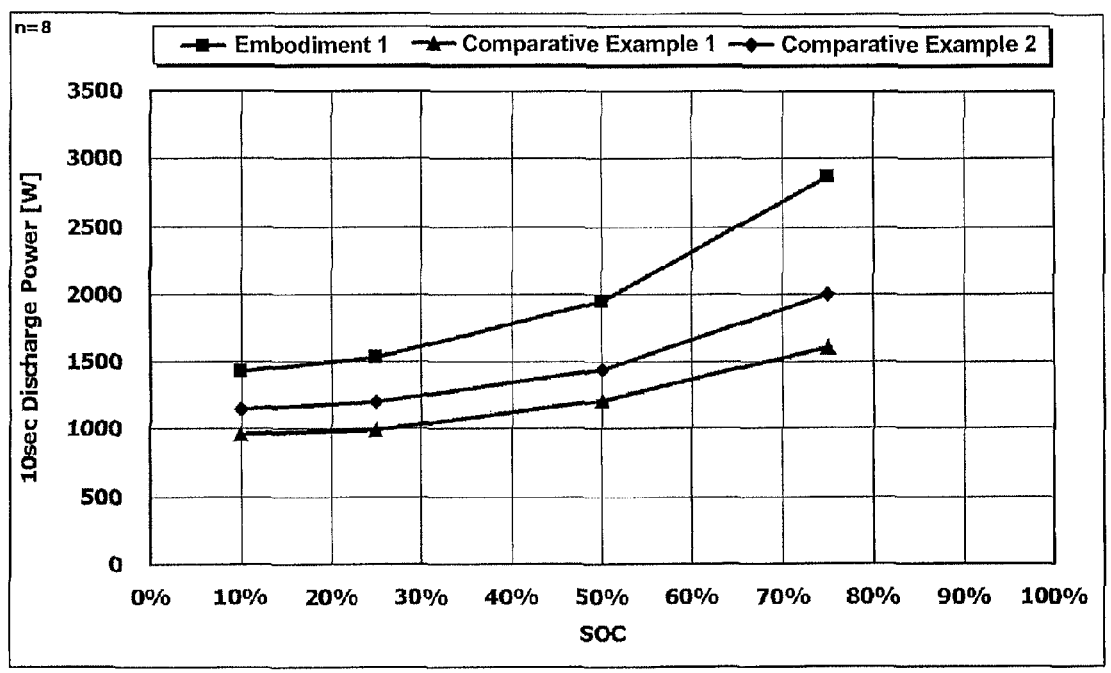

LITHIUM SECONDARY BATTERY POSITIVE ELECTRODE MATERIAL FOR IMPROVING OUTPUT CHARACTERISTICS AND LITHIUM SECONDARY BATTERY INCLUDING THE SAME

CROSS-REFERENCE TO RELATED APPLICATIONS

This application is a continuation of International Application No. PCT/KR2012/002537 filed on Apr. 4, 2012, which claims priority from Korean Patent Application No. 10-2011-0030665 filed with Korean Intellectual Property Office on Apr. 4, 2011, the entire contents of which are incorporated herein by reference.

BACKGROUND OF THE INVENTION

The present invention disclosed herein relates to a lithium secondary battery positive electrode active material for improving output characteristics and a lithium secondary battery including the same.

As the development of techniques and demand for mobile devices are increasing, the demand of secondary batteries as an energy source has been rapidly growing. Among secondary batteries, a lithium secondary battery having a high energy density and voltage, a long cycle life span, and a low self-discharge rate, has been commercialized and widely used. Furthermore, as people are increasingly interest in the environment issues, studies for an electric vehicle, a hybrid electric vehicle, or the like, which may replace the vehicles, such as a gasoline vehicle, a diesel vehicle, or the like, using fossil fuel, one of major causes of air pollution, has been greatly conducted. Recently, studies into the use of a lithium secondary battery having a high energy density and discharge voltage as a power source of an electric vehicle, a hybrid electric vehicle, or the like, is actively ongoing and a lithium secondary battery is partially in a commercialization stage.

In particular, studies for developing a positive electrode material of a large capacity lithium secondary battery to be used for an electric vehicle are comprehensively carried out to replace currently used $LiCoO_2$.

In case of LiCoO2 that is the existing typical positive material, the $LiCoO_2$ has reached its limit in an increase in an energy density and a practical use of output characteristics, and in particular, when LiCoO2 is used in a high energy density application field, its structure is denatured at a high charge state due to a structural instability and oxygen in the structure is discharged to cause an exothermic reaction with electrolyte in a battery to mainly cause a battery explosion. Thus, in order to improve the instability of $LiCoO_2$, the use of a lithium-containing manganese oxide and lithium-containing nickel oxide ($LiNiO_2$) such as $LiMnO_2$ having a layered crystal structure, $LiMn_2O_4$ having a spinel crystal structure, or the like, has been considered. Recently, a great deal of studies into the use of 3-component system layered oxides of Ni, Mn, and Co has been done.

An oxide expressed as chemical formula $Li[Ni_{1/3}Co_{1/3}Mn_{1/3}]O_2$, that is the most typical layered oxide among the 3-component system layered oxides, is changed from $Ni^{2+}$ to $Ni^{3+}$ or $Ni^{4+}$ according to the depth of charge when charging is performed. However, unlike stable $Ni^{2+}$, $Ni^{3+}$ or $Ni^{4+}$ (in particular $Ni^{4+}$) loses lattice oxygen due to instability so as to be reduced to $Ni^{2+}$, and the lattice oxygen reacts with electrolyte to change the surface qualities of an electrode or increase a charge transfer impedance of the surface of the electrode to reduce the capacity or degrade high rate capability.

In order to improve the limitation of the instability of the 3-component system layered oxide, technologies for mixing a metal oxide having an existing olivine structure with the 3-component system positive electrode active material have been known.

In particular, $LiFePO_4$ positive electrode material having an olivine structure using Fe has been come into the spotlight because of stability of the crystal structure and low costs of the Fe. Thus, a mixture of the $LiFePO_4$ and the 3-component system layered oxide having the above-described advantages has been proposed as a positive electrode active material having improved stability.

However, in a case of the positive electrode active material containing the mixture of the $LiFePO_4$ having the olivine structure and the 3-component system layered oxide, the positive electrode active material has a higher electrical resistance even in a state of the same open circuit voltage (OCV) when compared that the same 3-component system layered oxide is applied by itself alone. Thus, the positive electrode active material containing the mixture of the $LiFePO_4$ having the olivine structure and the 3-component system layered oxide has low output characteristics due to low conductivity in spite of the advantages of the low cost and high stability. Accordingly, a state of charge (SOC) area satisfying a required output is narrow, and thus an available SOC area may be limited.

To improve the limitation of the positive electrode material containing the mixture of the metal oxide having the olivine structure and the 3-component system metal oxide having the layered structure, there have been attempts to improve the mixed positive electrode material by adding a large amount of conductive material to reduce an electrical resistance. However, when the large amount of conductive material is added, the mixed positive electrode material has a high resistance as ever even though a ratio of the active material may be reduce to significantly reduce energy density. Accordingly, the limitations of the reduction of the output characteristics and the limited available SOC area remain as ever.

The low output characteristics are a problem to be solved for using the lithium secondary batteries as medium-large size secondary batteries for electric vehicles. Therefore, studies with respect to secondary batteries having widely available SOC area while maintaining a high output are urgently required.

SUMMARY OF THE INVENTION

Therefore, in order to address the above limitations, the inventors of the present application conducted in-depth research and various experiments to notice that the conductive is not improved even though a large amount of conductive material is added to the mixed positive electrode active material of the metal oxide having the olivine structure and the 3-component system metal oxide having the layered structure, and also, the electrical resistance is merely increased when compared that the 3-component system is used alone. Furthermore, when the two or more conductive materials having particle sizes and shapes different from each other are simultaneously coated as a conductive material, the conductivity of the mixed positive electrode material including the two or more conductive materials may be improved, and thus, the electrical resistance may be reduced to improve output characteristics of the positive electrode material for the lithium secondary battery.

Embodiments of the present invention provide lithium secondary battery positive electrode materials including: a mixed positive electrode active material comprising a 3-component system lithium-containing metal oxide having a layered structure expressed as following Chemical Formula 1 and a metal oxide having an olivine structure expressed as following Chemical Formula 2; and two or more conductive materials having particle shapes and sizes different from each other.

$Li_{1+a}Ni_xCo_yMn_{1-x-y}O_2$, $0 \leq a < 0.5$, $0 < x < 1$, $0 < y < 1$  [Chemical Formula 1]

$A_xM_yM'_zXO_4$  [Chemical Formula 2]

(where, A is at least one selected from alkali metals, M and M' are at least one selected from transition metal elements, X is any one selected from the group consisting of P, Si, S, As, Sb, and combinations thereof, and $x+y+z=2$)

Chemical formula 1 of the 3-component system lithium-containing metal oxide having the layered structure may have following conditions: $0 \leq a < 0.2$, $0 < x < 0.8$, $0 < y < 0.5$.

The 3-component system lithium-containing metal oxide, which is expressed as Chemical Formula 1, may be expressed as following Chemical Formula: $Li1+aNi_{1/3}Co_{1/3}Mn_{1/3}O_2$ ($0 \leq a < 0.2$).

The metal oxide having the olivine structure, which is expressed as Chemical Formula 2, may be expressed as following Chemical Formula: $LiMPO_4$ (where, M is at least one selected from the group consisting of Fe, Co, Ni, and Mn), preferably, $LiFePO_4$.

The metal oxide having the olivine structure, which is expressed as Chemical Formula 2, may be contained in a ratio of about 5 wt % to about 50 wt % with respect to the 3-component system lithium-containing metal oxide, which is expressed as Chemical Formula 1, on the basis of the total weight of the mixed positive electrode active material.

The metal oxide having the olivine structure, which is expressed as Chemical Formula 2, may be contained in a ratio of about 10 wt % to about 40 wt % with respect to the 3-component system lithium-containing metal oxide, which is expressed as Chemical Formula 1, on the basis of the total weight of the mixed positive electrode active material.

The two or more conductive materials having the particle shapes and sizes different from each other may be formed of graphite and conductive carbon.

The two or more conductive materials having the particle shapes and sizes different from each other may have a content of about 0.5 wt % to about 15 wt % with respect to the total weight of the lithium secondary battery positive electrode material.

The conductive carbon may include carbon black, such as carbon black, acetylene black, Ketjen black, channel black, furnace black, lamp black, summer black, or the like, or a material having a graphene or graphite crystal structure.

The mixed positive electrode active material may further include at least one lithium-containing metal oxide selected from the group consisting of lithium manganese spinel and an oxide in which other elements(s) is(are) replaced or doped with/into the lithium manganese spinel.

The other element(s) may be any one element or two or more elements selected from the group consisting of Al, Mg, Mn, Ni, Co, Fe, Cr, V, Ti, Cu, B, Ca, Zn, Zr, Nb, Mo, Sr, Sb, W, and Bi.

The lithium-containing metal oxide may be contained in about 50 wt % or less on the basis of the total weight of the mixed positive electrode active material.

Other embodiments of the present invention provide positive electrodes for secondary battery including the lithium secondary battery positive electrode material.

Still other embodiments of the present invention provide lithium secondary batteries including the positive electrode for secondary battery. The lithium secondary batteries may be used as unit batteries of a battery module that is a power source for a middle or large-sized device. Here, the middle or large-sized device may include: a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a graph illustrating an output variation depending on a SOC of lithium secondary batteries according to an embodiment and comparative examples.

DETAILED DESCRIPTION OF PREFERRED EMBODIMENTS

The present invention provides a lithium secondary battery containing a mixed positive electrode material of a 3-compoennt system lithium-containing metal oxide having a layered structure (hereinafter, referred to as a "3-component system) and a metal oxide having an olivine structure (hereinafter, referred to as an "olivine") which is simultaneously coated with graphite and conductive carbon, which have sizes and shapes different from each other, as a conductive material.

Exemplary embodiments of the present invention will now be described in detail.

A 3-component system included in a positive electrode active material according to the present invention may be expressed as following Chemical Formula 1.

$Li_{1+a}Ni_xCo_yMn_{1-x-y}O_2$, $0 \leq a < 0.5$, $0 < x < 1$, $0 < y < 1$  [Chemical Formula 1]

The 3-component system lithium-containing metal oxide expressed as Chemical Formula 1 may be expressed as following Chemical Formula: $Li_{1+a}Ni_xCo_yMn_{1-x-y}O_2$, $0 \leq a < 0.2$, $0 < x < 0.8$, $0 < y < 0.5$, in particular, $Li_{1+a}Ni_{1/3}Co_{1/3}Mn_{1/3}O_2$ ($0 \leq a < 0.2$) (where, $x=y=1/3$).

In the 3-component system lithium-containing metal oxide, as described above, as an operation voltage of the 3-component system is significantly increased at a lower end thereof, an output may be significantly reduced in a low SOC area to very limit an available SOC area. Thus, it may be limited that the 3-component system is used by itself alone as a positive electrode material.

In order to improve a limitation of the instability of the 3-component system lithium-containing metal oxide, the prevent invention provides a mixed positive electrode material in which olivine having a stable structure and the 3-component system are mixed with each other.

To improve the instability of the 3-component system, the olivine may be expressed as following Chemical formula 2.

$A_xM_yM'_zXO_4$  [Chemical Formula 2]

(where, A is one or more selected from alkali metals, M and M' are one or more selected from transition metal elements, X is any one selected from the group consisting of P, Si, S, As, Sb, and combinations thereof, and x+y+z=2)

The olivine may be expressed as following Chemical Formula: $LiMPO_4$ (where, M=one or more selected from the group consisting of Fe, Mn, Co, and Ni). Furthermore, to secure a discharge output in a 3V range, the olivine may be expressed as following Chemical Formula: $LiFePO_4$. Here, the $LiFePO_4$ may have a relative low charge potential, a stable crystal structure, and low costs.

The olivine has a mean theoretical capacity of about mAh/g and a standard reduction potential of about 3.4 V. This voltage is not so high as to decompose electrolyte but allows for maintaining energy density.

The content of the olivine may be about 5 to wt % about 50 wt % to the total amount of the mixed positive electrode material in which the 3-component system expressed as Chemical Formula 1 is mixed with the olivine, and more preferably, the content of the olivine may be about 10 wt % to about 40 wt %.

If the content of the olivine is less than about 5 wt %, it may be difficult to realize improved output assistance and stability in the low SOC area due to the too small content of the olivine. On the other hand, if the content of the olivine is more than 50 w %, it may be difficult to obtain a cell having high energy due to a low energy density.

In general, the mixed positive electrode material of the 3-component system and the olivine includes a conductive material to improve the conductivity of the olivine having the low conductivity and the whole conductivity of the mixed positive electrode material. However, the inventors of the present application confirmed a limitation that the improved effect of the conductivity of the mixed positive electrode material is insufficient when the conductive material is added to the mixed positive electrode material of the 3-component system and the olivine through a general method. Furthermore, the inventors confirmed a limitation that the mixed positive electrode material of the 3-component system and the olivine has a voltage band having a relatively high resistance rather than that of a positive electrode material including only the same 3-component system under the same open circuit voltage (OCV). This was the same even though an amount of the conductive material added to the mixed positive electrode material is increased.

The inventions of the present application conducted in-depth research and various experiments to notice that reasons of the high electrical resistance and low conductivity of the mixed positive electrode material of the 3-component system and the olivine are caused by a large difference between particle sizes or surface areas of the mixed 3-component system and olivine.

That is, when a difference between particle sizes or surface areas of the mixed components is large, the conductive material to be coated may be concentrated into either component having a relatively large surface area. Accordingly, the other component having relative less distribution of the conductive material has a high resistance rather than that of a single component to reduce the conductivity. This phenomenon is the same even though an amount of conductive material is continuously increased.

In particular, in case of the mixed positive electrode material of the 3-component system and the olivine, the olivine has a particle size less than that of the 3-component system. That is, the 3-component system has a surface area of about 0.3 $m^2/g$ to about 1 $m^2/g$, but the olivine has a mean surface area of about 10 $m^2/g$ to about 40 $m^2/g$. Thus, a difference of about 20 times to about 50 times between the two components occurs in surface area.

Thus, in case of a mixed positive electrode material including the components having a large surface area difference therebetween, since the added conductive material selectively exists only around the olivine, the conductivity of the 3-component system which is not coated with the conductive material may be further deteriorated even though a large amount of conductive material is continuously added. Thus, the conductivity of the mixed positive electrode material may be reduced on the whole to significantly increase a resistance.

Thus, according to the present invention, in order to provide a mixed positive electrode material of a 3-component system and olivine in which the conductive material is uniformly distributed within the mixed positive electrode material of the 3-component system and the olivine, but is not concentrated into any one component, to improve conductivity, two or more conductive materials having particle sizes and shapes different from each other may be added as a conductive material.

In an exemplary embodiment of the present invention, the two or more conductive materials may be materials to which conductive carbon having a circular shape and graphite having a plate shape are applied at the same time. That is, when the conductive materials having particle sizes and shapes different from each other, such as the circular-shaped conductive carbon and the plate-shaped graphite, are applied at the same time, it may prevent the conductive materials from being concentrated into any one component constituting the mixed positive electrode material, and the conductive materials may be uniformly coated within the mixed positive electrode material. In addition, since the conductive material is not distributed on only surfaces of the 3-component system and the olivine, but is sufficiently distributed also on a contact portion between the two materials, a conductive path between the 3-component system and the olivine may be sufficiently formed.

Thus, the mixed positive electrode material may be increased in electrical conductivity and reduced in resistance to improve an output.

The carbon and graphite which are applied for manufacturing the mixed positive electrode material as an exemplary embodiment of the present invention are not particularly limited so long as they have superior electrical conductivity and also have conductivity without causing additional reaction in an inner environment of a secondary battery or a chemical change in the corresponding battery.

In particular, the graphite is not limited to natural graphite, artificial graphite, or the like. The conductive carbon may include a carbon-based material having high conductivity. For example, the conductive carbon may include carbon black such as carbon black, acetylene black, Ketjen black, channel black, furnace black, lamp black, summer black, or the like; or a material having a graphene or graphite crystal structure. However, the present invention is not limited thereto. As necessary, the conductive carbon may include a conductive polymer having high conductivity.

Here, when an amount of mixture in which the graphite and the conductive carbon are mixed with each other is too small, it may be difficult to except desired effects. On the other hand, when the amount of mixture is too large, an amount of active material may be relatively reduced. Thus, the content of the mixture of the graphite and the conductive carbon may be about 0.5 wt % to about 15 wt % on the basis of the total weight of the mixed positive electrode material of the 3-component system expressed as Chemical Formula 1, the olivine expressed as Chemical Formula 2, the graphite, and the conductive carbon. Here, the content of the conductive carbon may be about 1 wt % to about 13 wt %, and more preferably, about 3 wt % to about 10 wt %.

A method of manufacturing the mixed positive electrode material is not specifically limited, and thus may use a well-known positive electrode manufacturing method. For example, the mixed positive electrode material may be manufactured using a method in which a binder, a positive electrode active material, and the two or more conductive materials are put into a solvent and then dispersed to manufacture slurry, but is not limited thereto.

The mixed positive electrode material according to the present invention may further include lithium manganese spinel and an oxide in which other element(s) is(are) replaced or doped with/into the lithium manganese spinel in addition to the 3-component system expressed as Chemical Formula 1, the olivine expressed as Chemical Formula 2, two or more conductive materials having particle shapes and sizes different from each other. The other element(s) may be at least one selected from the group consisting of Al, Mg, Mn, Ni, Co, Fe, Cr, V, Ti, Cu, B, Ca, Zn, Zr, Nb, Mo, Sr, Sb, W, and Bi.

In particular, the lithium-containing metal oxide may be contained in about 50 weight parts or less on the basis of 100 weight parts of the mixed positive electrode material.

Also, the mixed positive electrode material may further selectively include a binder and a filler.

The binder is a component for assisting the combining between the 3-component system and olivine and the conductive material and the combining with respect to a collector. In general, the binder is added by about 1 wt % to about 50 wt % on the basis of the total weight of the mixed positive electrode material. For example, the binder may include polyvinylidene difluoride, polyvinyl alcohol, carboxymethylcellulose (CMC), starch, hyddroxypropylcellulose, regenerated cellulose, polyvinylpyrrolidone, tetrafluoreethylene, polyethylene, polypropylene, ethylene-propylene-diene terpolymer (EPDM), sulfonic EPDM, styrene butylene rubber, fluorinated rubber, various polymers, and the like.

The filler may be selectively used as components for restraining expansion of the positive electrode. The filler is not particularly limited so long as it is a fibrous material without causing a chemical change in the corresponding battery. The filter may include, for example, an olefin-based polymer such as polyethylene, polypropylene, or the like; a fibrous material such as glass fiber, carbon fiber, or the like.

The present invention also provides a positive electrode for secondary battery in which the mixed positive electrode is applied to the collector.

For example, slurry, which is generated by mixing the mixed positive electrode material, the conductive material, the binder, and the filler with a solvent such as NMP, may be applied to a negative electrode collector, and then dried and rolled to manufacture the positive electrode for secondary battery on a positive electrode collector.

The positive electrode collector generally has a thickness ranging from about 3 μm to about 500 μm. The positive electrode collector is not particularly limited so long as it has high conductivity without causing a chemical change in the corresponding battery. The positive electrode collector may include, for example, stainless steel, aluminum, nickel, titanium, fired oxygen, or a collector obtained by surface-treating aluminum or stainless steel with carbon, nickel, titanium, silver, or the like. The positive electrode collector may have a surface with fine roughness to improve a bonding strength with the positive electrode active material. The positive electrode collector may include a film, a sheet, foil, a net, a porous body, a foam body, a non-woven fabric body, and the like.

The present invention also provides a lithium secondary battery constituted by the positive electrode, a negative electrode, a separator, and a lithium salt-containing non-aqueous electrolyte.

The negative electrode may be manufactured by applying a negative electrode mixture including a negative electrode active material to a negative electrode collector and drying the same. As necessary, the negative electrode mixture may further include the above-described components.

The negative electrode collector generally has a thickness ranging from about 3 μm to about 500 μm. The negative electrode collector is not particularly limited so long as it has conductivity without causing a chemical change in the corresponding battery. For example, the negative electrode collector may include copper, stainless steel, aluminum, nickel, titanium, a carbon material, a material obtained by treating a surface of copper or stainless steel with carbon, nickel, titanium, silver, or the like, an aluminum-cadmium alloy, or the like. Also, like the positive electrode collector, the negative electrode collector may have a surface with a fine roughness to improve a bonding strength with a negative electrode active material. The negative electrode collector may include a film, a sheet, foil, a net, a porous body, a foam body, a non-woven fabric body, and the like.

The separator is disposed between negative electrodes. An insulating thin film having high ion permeability and mechanical strength is used as the separator. The separator has a pore diameter generally ranging from about 0.01 μm to about 10 μm and a thickness generally ranging from about 5 μm to about 300 μm. For example, the separator may include an olefin-based polymer such as chemical resistant and hydrophobic polypropylene, or the like; and a sheet or non-woven fabric which is formed of a glass fiber or polyethylene, or the like. When solid electrolyte such as polymer or the like is used as the electrolyte, the solid electrolyte may also serve as the separator.

The lithium salt-containing non-aqueous electrolyte includes aqueous electrolyte and lithium salt. A non-aqueous organic solvent, organic solid electrolyte, inorganic solid electrolyte, or the like, is used as the aqueous electrolyte.

For example, the non-aqueous organic solvent may include an aprotic organic solvent such as N-methyl-2-pyrrolidinone, propylele carbonate, ethylene carbonate, butylenes carbonate, dimethyl carbonate, diethyl carbonate, gamma-butylolactone, 1,2-dimethoxy ethane, tetrahydroxy franc, 2-methyl tetrahydrofuran, dimethylsulfoxide, 1,3-dioxoran, formamide, dimethylformamide, dioxoran, acetonitrile, nitromethane, formic acid methyl, methyl acetate, phosphoric acid triester, trimethoxy methane, a dioxoran derivative, sulfolane, methyl sulfolane, 1,3-dimethyl-2-imidazolidinone, a propylene carbonate derivative, a tetrahydrofuran derivative, ether, propionic acid methyl, propionic acid ethyl, or the like.

For example, the organic solid electrolyte may include a polyethylene derivative, a polyethylene, oxide derivative, a polypropylene oxide derivative, a phosphoric acid ester polymer, a poly agitation lysine, polyester sulfide, polyvinyl alcohol, polyvinylidene difluoride (PVDF), a polymer including an ionic dissociable group or the like.

For example, the inorganic solid electrolyte may include nitride of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li4SiO_4$, $Li_4SiO_4$—$LiI$—$LiOH$, $Li_3PO_4$—$Li_2S$—$SiS_2$, halides, a sulfate, or the like.

The lithium salt may be a material which is easily dissolved in the non-aqueous electrolyte. For example, the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carbonic acid lithium, 4-phenyl boric acid lithium, imide, or the like.

Also, to improve charging/discharging characteristics, flammability, or the like, for example, pyridine, triethylphosphite, triethanolamine, cyclic ether, ethylene diamine, n-glyme, hexa phosphoric acid tri amide, a nitrobenzene derivative, sulfur, quinonimin-dyes, N-substituted oxazolidinone, N,N-substituted imidazolidine, ethylene, glycol dialkyl ether, ammonium salt, pyrrol, 2-methoxy ethanol, aluminum trichloride, or the like, may be added to the non-aqueous electrolyte. As necessary, a halogen-containing solvent such as carbon tetrachloride, ethylene trifluoride, or the like, may be further included in order to provide noninflammability, or carbon dioxide may be further included in order to improve high temperature preservation characteristics.

The secondary battery according to an exemplary embodiment of the present invention may be used for a battery cell used as a power source of a small device, or may be also preferably used as a unit cell in a midsize or large battery module including a plurality of cells.

For example, the middle or large-sized device may be, for example, a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system, but is not limited thereto.

Hereinafter, the present invention will now be described in more detail through embodiments, but the embodiments hereinafter are merely for illustrating the present invention and the scope of the present invention is not limited thereto.

Embodiment 1

Manufacture of Positive Electrode

About 90 wt % of mixture, which consists of about 70 wt % of Li[Ni$_{1/3}$Co$_{1/3}$Mn$_{1/3}$]O$_2$ and bout 30 wt % of LiFePO$_4$, together with about 2 wt % of graphite, 4 wt % of denka black, and 4 wt % of PVDF may be added to an NMP to generate a slurry. The slurry is applied to a positive electrode collector and then rolled and dried to manufacture a positive electrode for a secondary battery.

Manufacture of Lithium Secondary Battery

A porous polyethylene separator is disposed between graphite-based negative electrodes, and then lithium electrolyte is injected to manufacture a polymer type lithium secondary battery including the positive electrode manufactured through the above-described process.

The polymer type lithium secondary battery is formed at about 4.6 V, and then an output thereof is measured according to a SOC while being charged and discharged between about 4.2 V and about 2.5 V (C-rate=0.1 C).

Comparative Example 1

A positive electrode active material containing about 90 wt % of mixture, which consists of about 70 wt % of Li[Ni$_{1/3}$Co$_{1/3}$Mn$_{1/3}$]O$_2$ and bout 30 wt % of LiFePO$_4$, 6 wt % of denka black, and 4 wt % of PVDF is manufactured to manufacture a polymer type lithium secondary battery in the same manner as that of Embodiment 1.

Comparative Example 2

A positive electrode active material containing about 88 wt % of mixture, which consists of about 70 wt % of Li[Ni$_{1/3}$Co$_{1/3}$Mn$_{1/3}$]O$_2$ and bout 30 wt % of LiFePO$_4$, 8 wt % of denka black, and 4 wt % of PVDF is manufactured to manufacture a polymer type lithium secondary battery in the same manner as that of Embodiment 1.

FIG. 1 illustrates an output variation of a full cell lithium secondary battery manufactured by Embodiment 1 and Comparative Examples 1 and 2 and measured at a voltage ranging from about 4.2 V to about 2.5 V according to the SOC.

The data illustrated in FIG. 1 is merely an example. That is, a detailed power value according to the SOC may be varied. Thus, it may be important to recognize the tendency of the graph than the detailed value. Referring to FIG. 1 in view of this, it may be seen that the lithium secondary battery according to an exemplary embodiment of the present invention has a significantly high output over the entire SOC area when compared to that of the lithium secondary battery according to the Comparative Examples 1 and 2. Also, when compared to Comparative Example 1, Comparative Example 2 has an insufficient output improvement effect. Thus, when only any one conductive material is included, it is seen that the output improvement effect of the battery is insufficient even through an added amount of conductive material is increased.

Therefore, it is seen that the lithium secondary battery according to the present invention may apply the conductive material having various structures and sizes to the mixed positive electrode material of the 3-component system and the olivine to improve the low conductivity of the mixed positive electrode material and high resistance occurrence, thereby significantly improving the output characteristics over the entire SOC area.

The positive electrode active material according to the present invention may provide the mixed positive electrode material of the 3-component system layered oxide and the metal oxide having the olivine structure, which are simultaneously coated with the two or more conductive material having the particle sizes and shapes different from each other, to allow particles within the mixed positive electrode material to have uniform conductivity. Therefore, the mixed positive electrode material may be reduced in electrical resistance and increased in output characteristics to provide the positive electrode active material having the widely available SOC area and the lithium secondary battery including the positive electrode active material.

Specifically, when the lithium secondary battery according to the present invention is used as a middle or large-sized battery for a power source of the electric vehicle, the lithium secondary battery may be used as a middle or large-sized lithium secondary battery which can sufficiently satisfy conditions such as desired output characteristics, capacity, and stability.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A lithium secondary battery positive electrode material consisting essentially of:
    a mixed positive electrode active material comprising a 3-component system lithium-containing metal oxide having a layered structure expressed as following Chemical Formula 1 and a metal oxide having an olivine structure expressed as following Chemical Formula 2; and
    two conductive materials having particle shapes and sizes different from each other:

$Li_{1+a}Ni_xCo_yMn_{1-x-y}O_2$, $0 \leq a < 0.5$, $0 < x < 1$, $0 < y < 0.5$  Chemical Formula 1

$A_xM_yM'_zXO_4$  Chemical Formula 2 where, A is at least one selected from alkali metals, M and M' are at least one selected from transition metal elements, X is any one selected from the group consisting of P, Si, S, As, Sb, and combinations thereof, and x+y+z=2, wherein the metal oxide having the olivine structure, which is expressed as Chemical Formula 2, is contained in a ratio of about 10 wt % to about 40 wt % with respect to the 3-component system lithium-containing metal oxide, which is expressed as Chemical Formula 1, on the basis of the total weight of the mixed positive electrode active material, and wherein the two conductive materials having the particle shapes and sizes different from each other are graphite and acetylene black, wherein the two conductive materials having the particle shapes and sizes different from each other, which are formed of graphite and acetylene black, have a content of about 0.5 wt % to about 15 wt % with respect to the total weight of the lithium secondary battery positive electrode material, wherein the acetylene black has a content of about 3 wt % to about 10 wt % with respect to the total weight of the lithium secondary battery positive electrode material, wherein a content ratio of acetylene black to graphite is 2:1, and wherein a particle size of the 3-component system lithium-containing metal oxide of the Chemical Formula 1 is larger than that of the metal oxide of the Chemical Formula 2, so that a surface area of the 3-component system lithium-containing metal oxide of the Chemical formula 1 is 0.3 to 1 m²/g and a surface area of the metal oxide of the Chemical Formula 2 is 10 to 40 m²/g.

2. The lithium secondary battery positive electrode material of claim 1, wherein the mixed positive electrode active material further comprises at least one lithium-containing metal oxide selected from the group consisting of lithium manganese spinel and an oxide in which other elements(s) is(are) replaced or doped with/into the lithium manganese spinel.

3. The lithium secondary battery positive electrode material of claim 2, wherein the other element(s) is(are) any one element or two or more elements selected from the group consisting of Al, Mg, Mn, Ni, Co, Fe, Cr, V, Ti, Cu, B, Ca, Zn, Zr, Nb, Mo, Sr, Sb, W, and Bi.

4. The lithium secondary battery positive electrode material of claim 2, wherein the lithium-containing metal oxide is contained in about 50 wt % or less on the basis of the total weight of the mixed positive electrode active material.

5. A positive electrode for secondary battery comprising the lithium secondary battery positive electrode material according to claim 1.

6. A lithium secondary battery comprising the positive electrode for secondary battery according to claim 5.

7. The lithium secondary battery of claim 6, wherein the lithium secondary battery is used as a unit battery of a battery module that is a power source for a device,
    wherein the device comprises: a power tool; a vehicle selected from the group consisting of an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system.

8. The lithium secondary battery positive electrode material of claim 1, wherein the lithium-containing metal oxide expressed by Chemical Formula 1 is $Li[Ni_{1/3}Mn_{1/3}Co_{1/3}]O_2$, and wherein the metal oxide expressed by Chemical Formula 2 is $LiFePO_4$.

* * * * *